(12) United States Patent
Batora

(10) Patent No.: US 7,216,441 B2
(45) Date of Patent: May 15, 2007

(54) APPARATUS FOR MEASURING STEP HEIGHT OR DEPTH AGAINST ANOTHER SURFACE

(76) Inventor: Robert Alan Batora, 1395 Primrose La., DeWitt, MI (US) 48820

( * ) Notice: Subject to any disclaimer, the term of this patent is extended or adjusted under 35 U.S.C. 154(b) by 0 days.

(21) Appl. No.: 11/193,965

(22) Filed: Jul. 29, 2005

(65) Prior Publication Data

US 2007/0022620 A1   Feb. 1, 2007

(51) Int. Cl.
   *G01B 3/20* (2006.01)
(52) U.S. Cl. .......................................... 33/836; 33/613
(58) Field of Classification Search ................. 33/613, 33/645, 706, 707, 708, 783, 784, 832, 833, 33/836
   See application file for complete search history.

(56) References Cited

U.S. PATENT DOCUMENTS

| | | | | |
|---|---|---|---|---|
| 4,165,566 A | * | 8/1979 | Lycan | 33/836 |
| 5,406,715 A | * | 4/1995 | Koizumi et al. | 33/706 |
| 5,491,907 A | * | 2/1996 | Vidmar | 33/832 |
| 5,574,381 A | * | 11/1996 | Andermo et al. | 33/705 |
| 5,657,550 A | * | 8/1997 | Struble | 33/613 |
| 2003/0217478 A1 | * | 11/2003 | Matsumiya et al. | 33/784 |
| 2005/0166415 A1 | * | 8/2005 | Kiwada et al. | 33/613 |

\* cited by examiner

*Primary Examiner*—G. Bradley Bennett

(57) ABSTRACT

An apparatus for measuring step height or depth against another surface with a measuring arm mounted horizontally beside the scale which has a beveled end allowing precise readings regardless if the apparatus is being held perpendicular, the apparatus has exchangeable measuring arms with various reaching capabilities, and a handle mounted to the top of the scale allowing the apparatus to be operated with one hand. A preferred embodiment includes the apparatus at four to five inches in length whereas an operator is able to measure height and depth in difficult to reach places. In one embodiment, the measuring arm is stainless steel and has longer measuring arms, the handle is made of any resilient material which allows the apparatus to be carried securely in one hand, pocket and or stored easily due to its small size, the apparatus disassembles for cleaning.

13 Claims, 8 Drawing Sheets

APPARATUS FOR MEASURING STEP HEIGHT OR DEPTH AGAINST ANOTHER SURFACE

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of measuring tools and more specifically to an apparatus for measuring surface (step) height or depth against another surface. Measuring tools are vital in the industrial work place. Engineers, machinists, and technicians rely on a variety of measuring tools to complete jobs. These workers need multiple tools to complete a complex or even simple measurement. Such daily tasks require many measurements, thus creating a lengthy and cumbersome process. This process is unwieldy but has become an accepted norm for each profession to carry out their jobs successfully.

Measuring tools have advanced over time and professionals rely on specific tools to give them accurate readings when completing jobs. There are two well known measuring tools for measuring step height or depth against another surface that are necessary in the work place. To measure the height of an object a user must use a height gauge. To measure the depth of a channel, the user must use a depth micrometer. Another widely acceptable method is the use of two scales: one laid across the surface as a straight edge and one held perpendicular to the straight edge. Each of these tools or methods are fundamental to the professionals who measure step heights or depth on a daily basis.

The prior technology is deficient because these tools cannot measure both the height and depth of a surface. The height gauge measures only the height of an object and is recommended to be used on a surface plate. The depth micrometer only measures depth. In all prior technology, the user must use both hands to successfully use these measuring tools. The tools are too large to be carried in a user's pocket and too unsteady to be used with one hand due to their awkward shape and large size.

BRIEF SUMMARY OF THE INVENTION

An apparatus that accurately measures the difference in the height or depth of two adjacent surfaces. The apparatus has a compact size and can be held in one hand. The apparatus is portable, lightweight and can be carried in a user's pocket. The measuring apparatus enables a user to quickly and efficiently measure the difference in the height and the depth of two adjacent surfaces. In accordance with one embodiment of the invention, there is disclosed an apparatus for measuring a surface height or depth against another surface comprising: a measuring arm mounted to a backing plate and positioned horizontally to a scale which has a beveled end allowing precise readings of surface heights and depths regardless of whether or not the apparatus is held perpendicular to the surface being measured. Replaceable measuring arms with various reaching capabilities are provided for attaching to the backing plate, and a handle mounted to one end of the scale allows the apparatus to be operated easily with one hand.

The present invention relates to an apparatus for measuring height differences between a first and second surface comprising a scale having opposed ends, a display unit assembly configured to have a sensor and slide along the scale between the ends, a measuring arm mounted horizontal to the scale; and a handle connected to one end of the scale enabling one handed operation.

The apparatus has a measuring arm, which has a beveled end. In one embodiment, the scale has a beveled end opposite the handle. The handle has an upper portion with a slot with a circular lower portion to allow for easier handling. The scale is mounted in the slot in the upper portion of the handle. The present invention also relates to a method of measuring the difference in height between a first and second surface which comprises the steps of: providing an apparatus including a scale having opposed ends, a display unit assembly configured to slide along the scale between the ends and having a sensor, a measuring arm horizontal to the scale, and a handle at one end of the scale enabling one handed operation, positioning the end of the scale opposite the handle on the first surface, moving the display unit assembly along the scale until the measuring arm contacts the first surface, zeroing out the display unit assembly, positioning the end of the scale opposite the handle on the first surface adjacent the second surface so that the measuring arm is positioned adjacent the second surface, and moving the measuring arm toward the second surface until the tip of the measuring arm contacts the second surface. The measuring arm is easily removable to allow replacement with a different measuring arm having different capabilities. Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
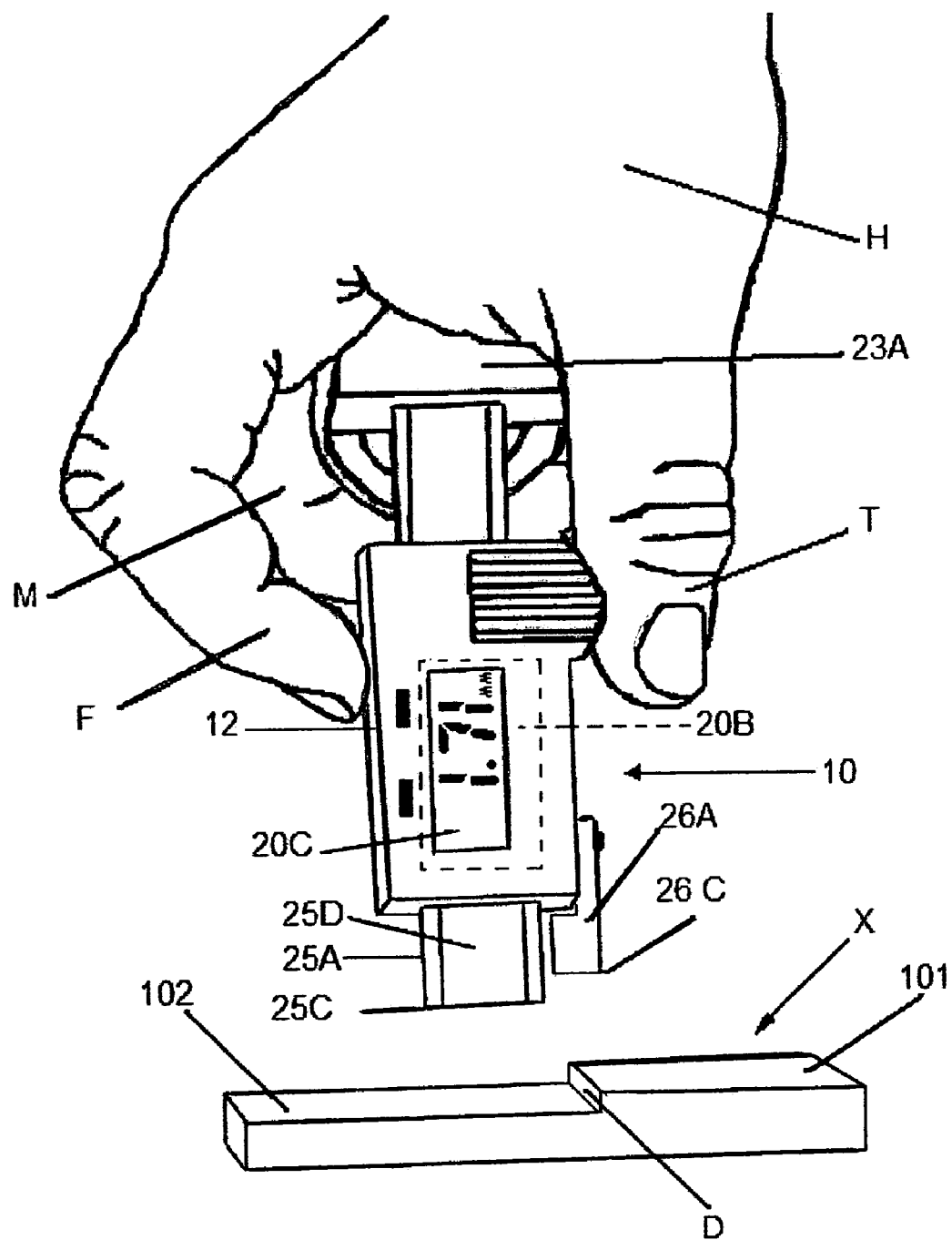
FIG. 1 is a perspective view of one embodiment of the step gauge 10 shown after taking a measurement of a step D in a block X.
Figure 11:
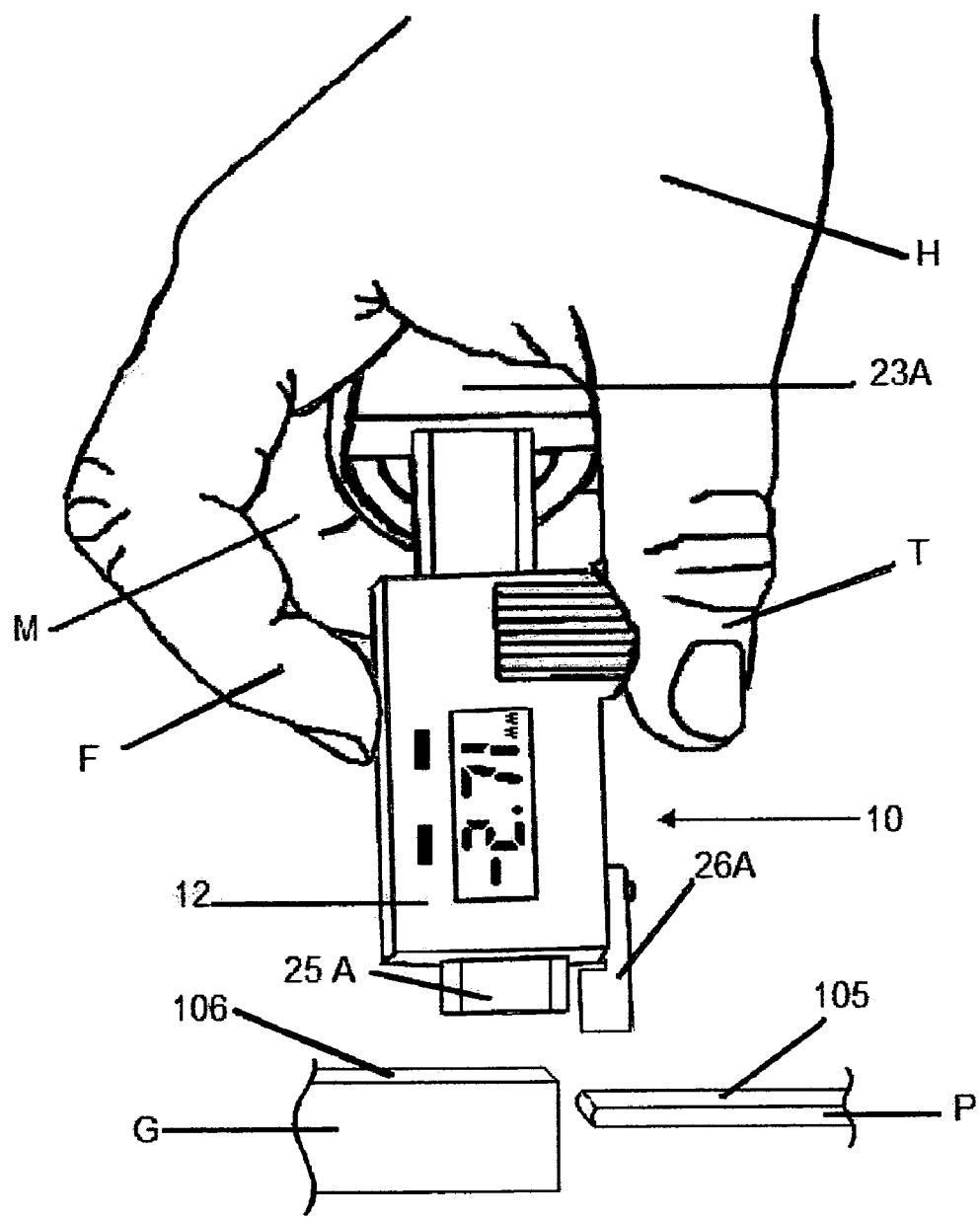
FIG. 11 is a perspective view of another embodiment of the step gauge 10 shown after taking a measurement of a panel P in relationship to a checking fixture gauge G.

The step gauge 10 is a bidirectional linear measuring apparatus that allows for measuring the difference in heights between two adjacent surfaces. The step gauge 10 can be positioned on either surface 101 or 102 to measure the height or depth of the adjacent surface 101 or 102 with respect to the other surface. In one embodiment, the first and second surfaces 101 or 102 are formed in a united piece (FIG. 1). In another embodiment, the first and second surfaces 106 and 105 are two separate pieces (FIG. 11).

The step gauge 10 includes a display unit assembly 12: which is similar in appearance to, and functions the same as those found on conventional digital read out calipers, a measuring arm 26A, a scale 25A and a handle 23A.

Turning now to the drawings, FIG. 1 illustrates one embodiment of the step gauge 10 of this invention after a step height measuring or reading of the adjacent surfaces 101 and 102 of the block X. By way of illustration, the step gauge 10 is shown being held and operated by the user with only one hand. In one embodiment, the scale 25A is approximately 4.5" (114 mm) in length. The length of the scale 25A allows the step gauge 10 to be operated with one hand.

Figure 2:
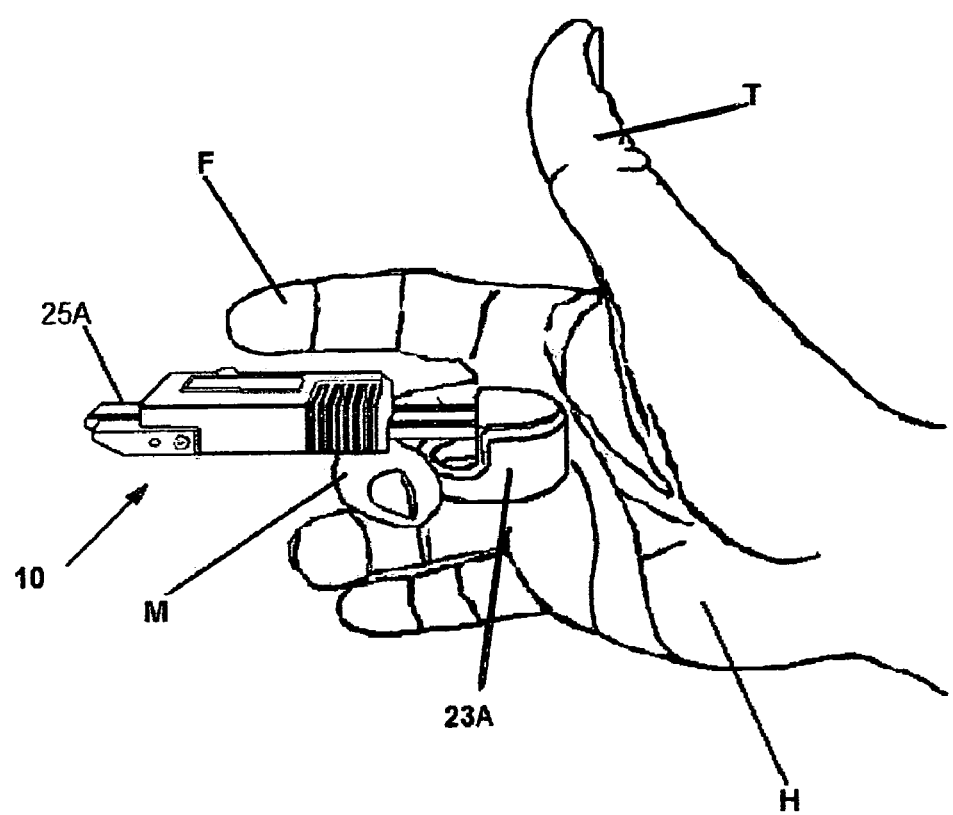
FIG. 2 is a perspective view of the step gauge 10 showing it held by a middle finger M against the palm of the user's hand H.

FIG. 2 shows how the step gauge 10 and more specifically, the handle 23A of the step gauge 10 is held with one hand. To hold and use the step gauge 10 properly, the middle finger M is wrapped around the handle 23A as the index finger F and the thumb T slide the display unit assembly 12 along the scale 25A.

Figure 3:
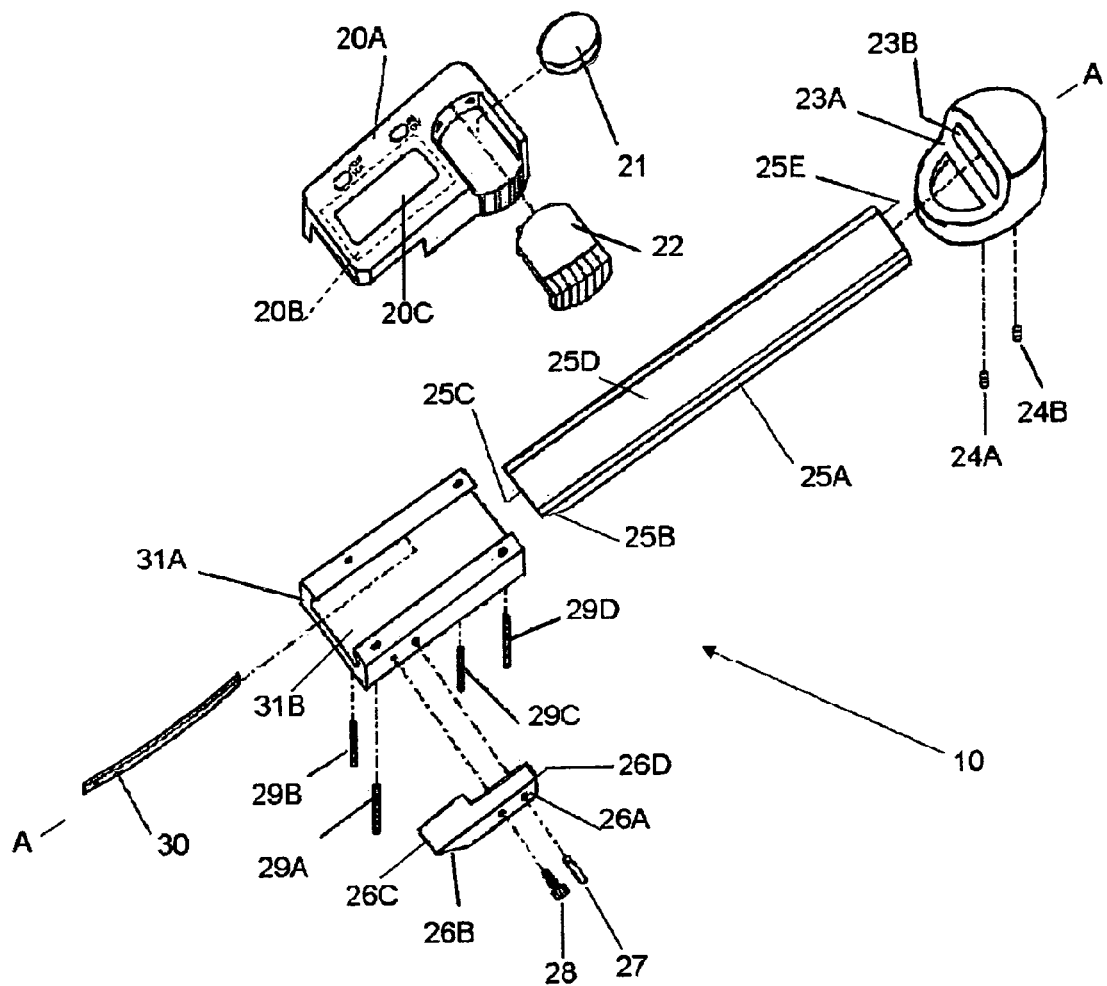
FIG. 3 is an exploded view of the step gauge 10.
Figure 4:
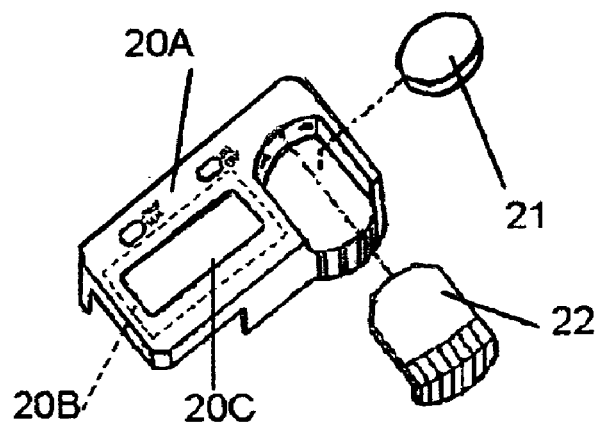
FIG. 4 is an exploded view of the display unit assembly 12.
Figure 4:
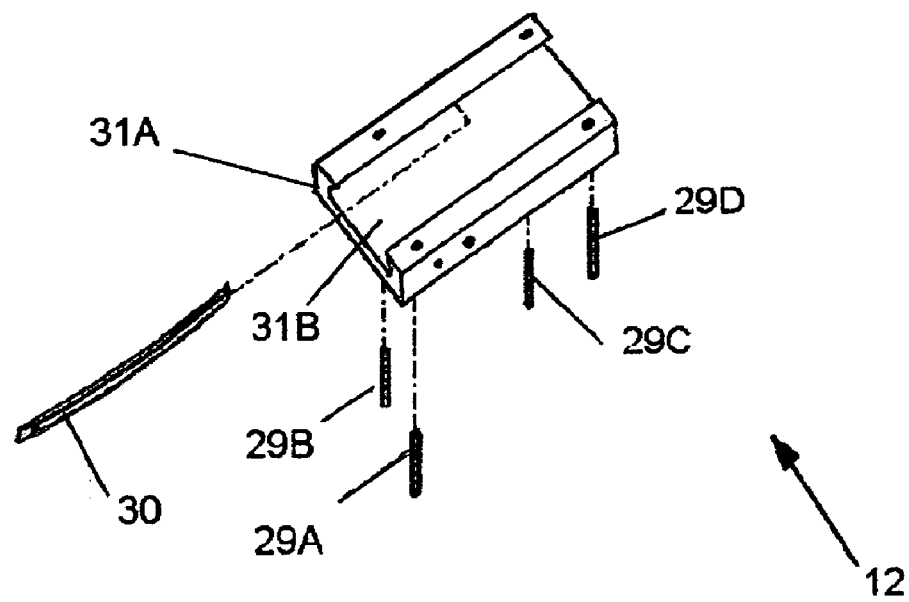
Figure 5:
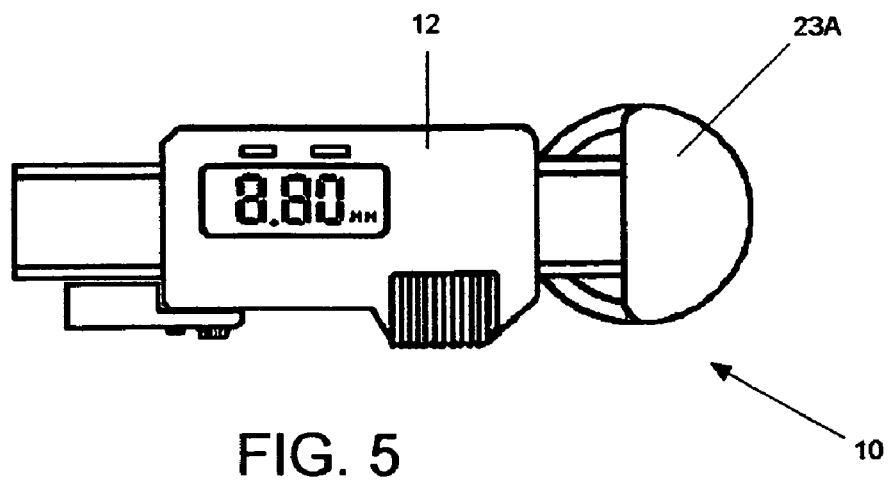
FIG. 5 is a front plan view of the step gauge 10.
Figure 6:
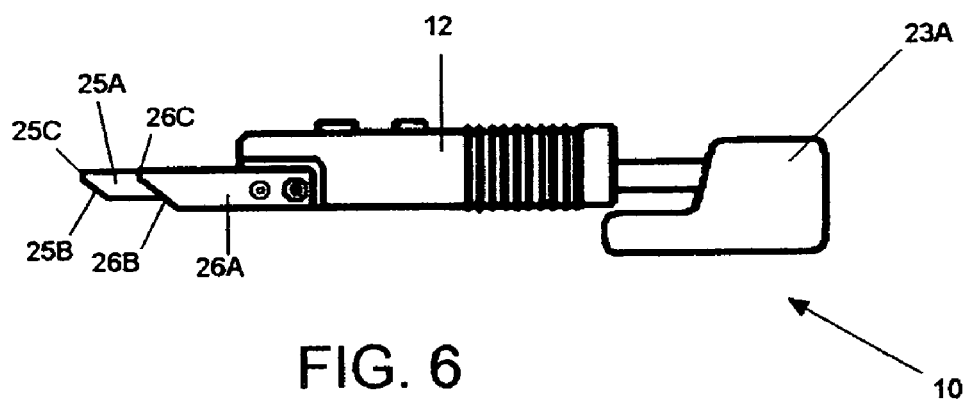
FIG. 6 is a side plan view of the step gauge 10.
Figure 7:
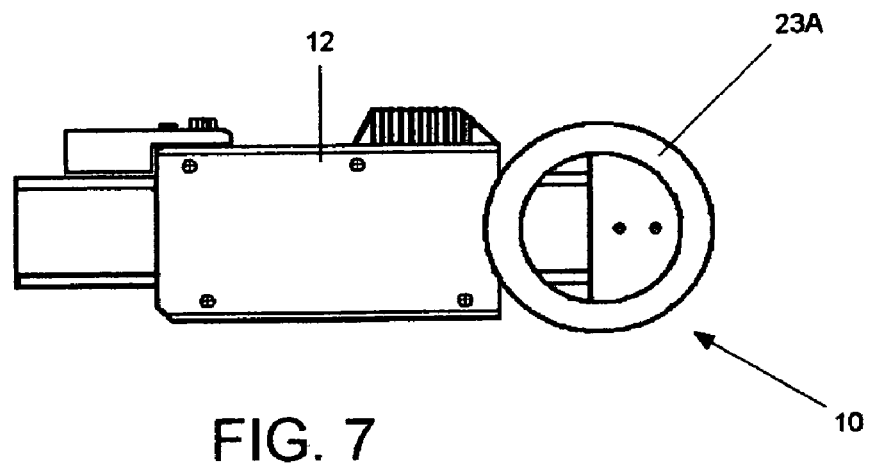
FIG. 7 is a back plan view of the step gauge 10.

In accordance with the present invention, FIG. 3 shows an exploded view of the step gauge 10. The step gauge 10 includes a display unit assembly 12, which includes a back plate 31A having a center groove 31B with a gib slider 30 inserted on one side of a groove 31B. The display unit assembly 12 also includes a display unit face 20A having a linear sensor strip 20B on the backside, which is connected to a digital, read out 20C. A battery 21 powers the linear sensor strip 20B and the digital read out 20C. The battery 21 is mounted in a slot on the front side of the display unit face 20A and is covered by a battery cover plate 22. Using back plate screws 29A–29D the display unit face 20A is mounted on the back plate 31A so that the backside of the display unit face 20A and the groove 31B of the backplate 31A form an opening through the display unit assembly 12. The linear. The scale 25A has an essentially rectangular shape with opposed ends 25B and 25E with a scale sensor strip 25D located on a top surface of the scale 25A between the ends 25C and 25E. The scale 25A has a longitudinal axis A—A formed by the ends 25B and 25E of the scale 25A (FIG. 3). is mounted on the scale 25A so that the scale 25A extends through the opening in the display unit assembly 12 such that the scale sensor strip 25D located on the top surface of the scale 25A is adjacent to the linear sensor strip 20B in the display unit face 20A. The handle 23A is positioned at one of the ends 25E of the scale 25A. The handle 23A has a circular lower portion and a semi-circular upper portion. The upper portion has a slot 23B. The scale 25A is mounted into the handle slot 23B in the upper portion so that when the back plate 31A is moved along the scale 25A, the back plate 31A is spaced apart from the lower portion of the handle 23A. The handle 23A is secured to the scale 25A by setscrews 24A–24B. The scale 25A extends outward from the front of the handle 23A parallel and spaced apart from the lower portion of the handle 23A. The back of the handle 23A, opposite the scale 25A, has a smooth and curved outer surface to allow for easier handling. The handle 23A is durable, ergonomically correct and lightweight. In one embodiment, the handle weighs less than one ounce for easy handling. In FIG. 6, the clearance between the handle 23A and the scale 25A allows the step gauge 10 to be hung or clipped onto a pocket or a pocket protector. The step gauge 10 can be carried in the user's hand. The compact size and shape of the handle 23A allows for a secure grip while using the step gauge 10 for measuring awkward or difficult to reach places. For the purpose of handling the step gauge 10 with one hand, the back of the handle 23A, shown in FIG. 7, has a circular shape allowing for a comfortable and sturdy grip in the user's hand.

The measuring arm 26A is mounted on the back plate 31A horizontal to the scale 25A. In one embodiment the measuring arm 26A is mounted on the backplate 31A using a measuring arm screw 28 and measuring arm dowel 27 (FIG. 3). In one embodiment, (FIG. 6) the measuring arm 26A has a beveled end 26B and the scale 25A has a beveled end 25B. The tips 26C and 25C of the beveled ends 26B and 25B enable the user to obtain precise height and depth readings regardless of whether or not the step gauge 10 is perpendicular to the surface on which the scale 25A is positioned during measuring.

Figure 8:
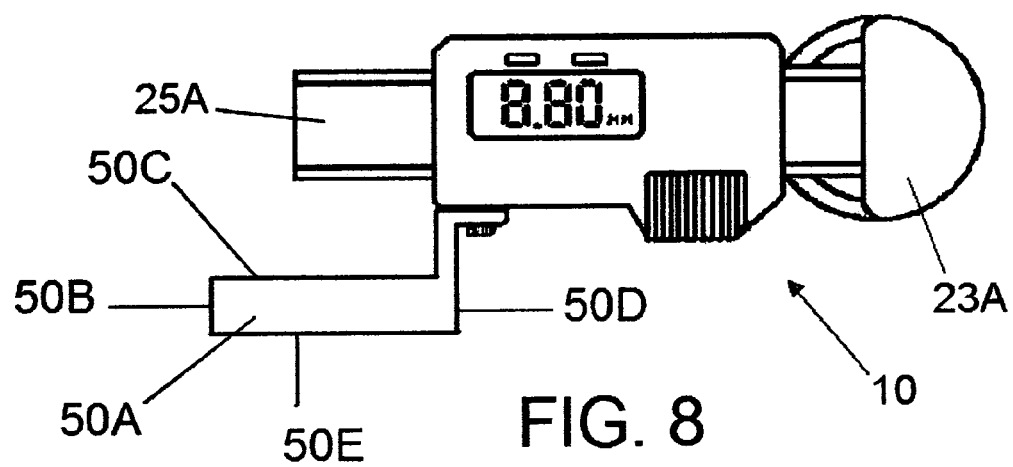
FIG. 8 is a plan view of the step gauge 10 showing a second embodiment of a measuring arm 50A.
Figure 9:
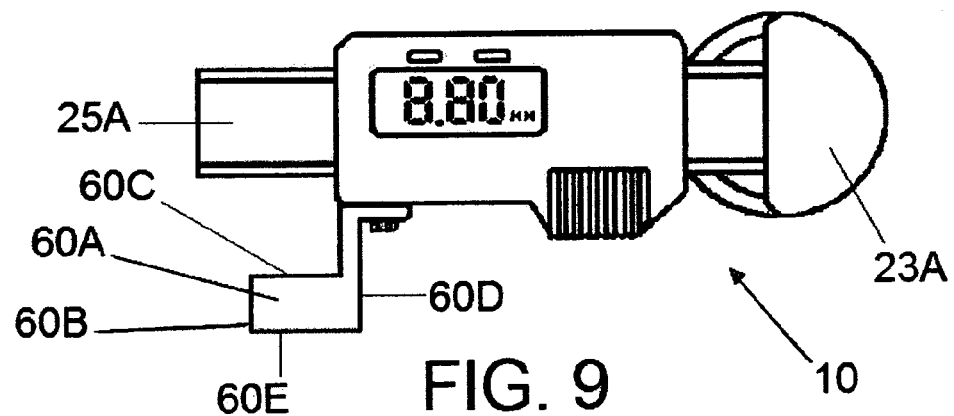
FIG. 9 is a plan view of the step gauge 10 showing a third embodiment of a measuring arm 60A.
Figure 10:
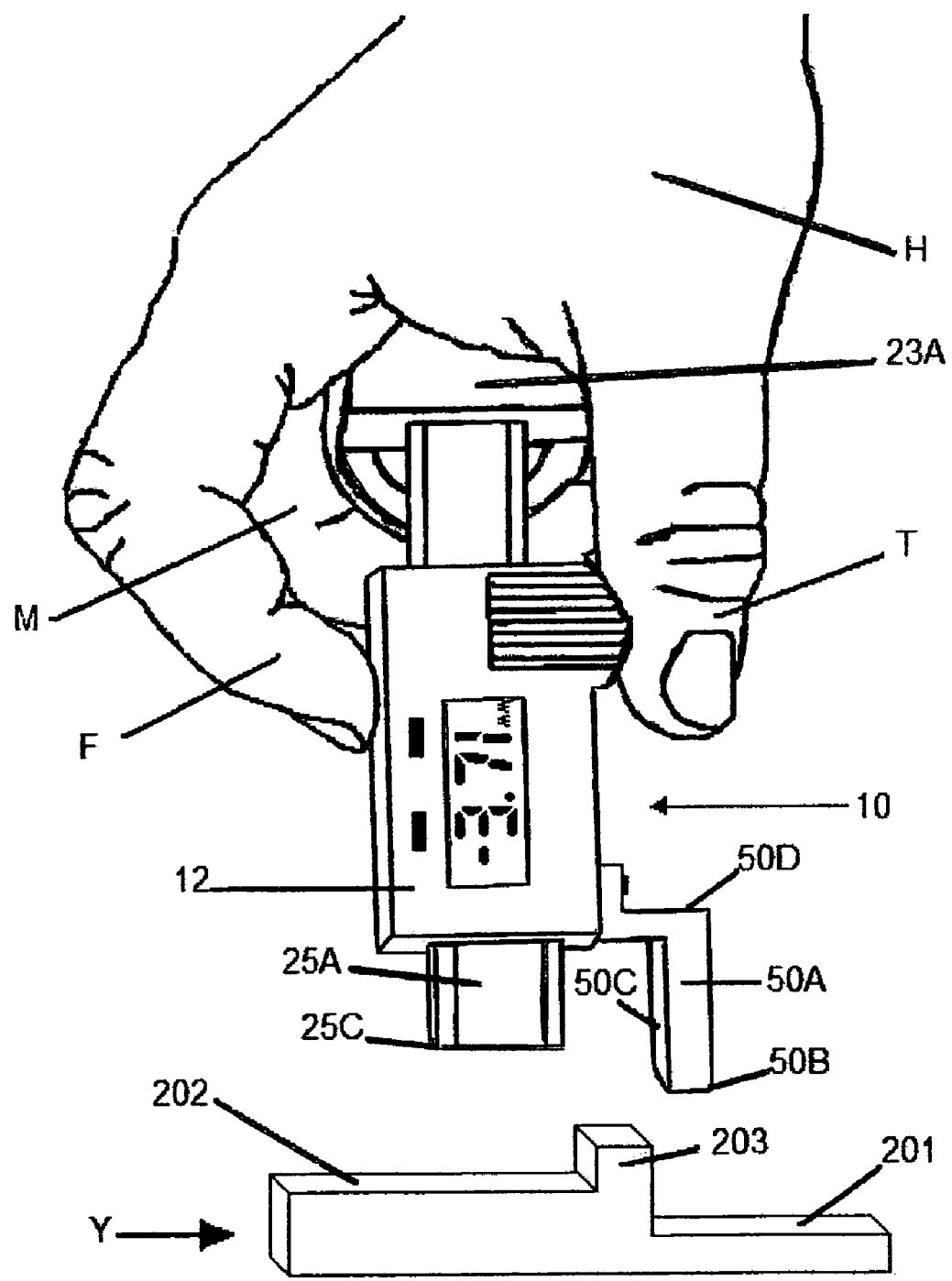
FIG. 10 is a perspective view of another embodiment of the step gauge 10 showing use of the measuring arm 50A.

It is a feature of the step gauge 10 that the measuring arm 26A is exchangeable. FIGS. 8 and 9 show two variations of exchangeable measuring arms 50A and 60A that can be used. The exchangeable measuring arms 50A and 60A have a first end and a second end with a first portion adjacent the first end and a second portion adjacent the second end. The first portion is essentially perpendicular to the second portion. The exchangeable measuring arms 50A and 60A are mounted at the first end to the display unit assembly 12. The first portion of the exchangeable measuring arms 50A and 60A extend outward from the display unit assembly 12 essentially perpendicular to the display unit assembly 12. The second portion of the exchangeable measuring arms 50A and 60A extend outward from the first portion in a direction away from the handle 23A. However, there are several measuring arms that can be exchanged and attached. The exchangeable measuring arms, 50A and 60A, have a range in lengths between the ends 50B and 50D and 60B and 60D and a range of clearances between the scale 25A and the inside of the arm 50C and 60C. These exchangeable measuring arms 50A and 60A have multiple reaching capabilities for different spacing or obstructions between the surfaces. FIG. 10 shows one embodiment of the step gauge 10 with the exchangeable measuring arm 50A after having just taken a measurement over obstruction 203 to obtain the height differences of surfaces 202 and 201 of block Y. FIG. 11 illustrates the step gauge 10 after measuring the height difference of the surface 105 of an automotive panel P and the surface 106 of a checking fixture gauge G. FIG. 11 shows that the step gauge 10 can measure adjacent surface height differences where the surfaces are spaced apart and not connected such that the height of one surface is not dependent on the height of the adjacent surface.

In use

To measure height as seen in FIG. 1, place the tip of the scale 25C on the first surface 102 and move the display unit assembly 12 toward the first surface 102 until the tip of the measuring arm 26C touches the first surface 102. Then, zero out the display unit assembly 12. Next, position the tip of the scale 25C beside the step D being measured so that the measuring arm 26A extends beyond. Move the display unit assembly 12 toward the second surface 101 until the tip 26C of the measuring arm 26A contacts the second surface 101. calculates the distance the display unit assembly 12 travels along the scale sensor strip 25D. The digital readout 20C will then read the correct height of the second surface 101 with reference to the first surface 102. To measure height differences around an obstruction as seen in FIG. 10, replace the measuring arm 26A with a greater reaching arm 50A and repeat the previously explained steps. Measuring the height difference between two spaced apart and disconnected surfaces (FIG. 11) would be similar to that described above for measuring the height differences of two surfaces that are part of a unitary piece (FIG. 1 and FIG. 10). While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus for measuring height differences between a first and second surface comprising:
   a) a scale having opposed ends;
   b) a display unit assembly having a sensor and configured to slide along the scale between the ends;
   c) a measuring arm mounted to the display unit assembly; and
   d) a handle connected to one end of the scale enabling one handed operation wherein, in use, the handle is in contact with a palm of a user's hand, wherein a finger of the user's hand contacts the display unit assembly to move the display unit assembly on the scale and wherein the measuring arm is positioned on the display unit assembly so that the measuring arm is able to extend beyond the end of the scale opposite the handle in a direction opposite the handle.

2. The apparatus of claim 1 wherein the measuring arm has a beveled end opposite the display unit assembly.

3. The apparatus of claim 1 wherein the end of the scale opposite the handle is beveled.

4. The apparatus of claim 1 wherein the handle has a circular lower portion to allow for easier handling.

5. The apparatus of claim 1 wherein the handle has a lower portion and an upper portion with a slot and wherein the scale is mounted in the slot in the upper portion of the handle.

6. The apparatus of claim 5 wherein the upper portion has a semi-circular shape.

7. The apparatus of claim 5 wherein an outer surface of the handle is curved.

8. The apparatus of claim 1 wherein the scale has a longitudinal axis formed between the ends and wherein the measuring arm is horizontal to the longitudinal axis of the scale.

9. The apparatus of claim 1 wherein the measuring arm has a first end and a second end with a first portion adjacent the first end and a second portion adjacent the second end, wherein, the first portion is essentially perpendicular to the second portion, wherein the measuring arm is mounted at the first end to the display unit assembly and wherein the first portion of the measuring arm extends outward from the display unit assembly essentially perpendicular to the display unit assembly and the second portion of the measuring arm extends outward from the first portion in a direction away from the handle.

10. The apparatus of claim 1 wherein in use, a second finger of the user's hand contacts the handle.

11. A method of measuring the difference in height or depth between a first and second surface which comprises the steps of:
   a) providing an apparatus including a scale having opposed ends, a display unit assembly configured to slide along the scale between the ends and having a sensor, a measuring arm mounted horizontal to the scale, and a handle at one end of the scale enabling one handed operation;
   b) positioning the end of the scale opposite the handle on the first surface;
   c) moving the display unit assembly along the scale until the measuring arm contacts the first surface;
   d) zeroing out the display unit assembly;
   e) positioning the end of the scale opposite the handle on the first surface adjacent the second surface so that the measuring arm is positioned adjacent the second surface; and
   f) moving the measuring arm toward the second surface until the measuring arm contacts the second surface enabling the display unit assembly to display the height or depth differences between the first and second surfaces.

12. The method of claim 11 wherein the end of the scale opposite the handle is beveled and wherein in step e, the scale is positioned on the first surface without being perpendicular to the first surface.

13. An apparatus for measuring height difference between a first and second surface comprising:
   a) a scale having opposed ends;
   b) a display unit assembly having a sensor and configured to slide along the scale between the ends with a tip at one end in a plane:
   c) a measuring arm having a tip of the measuring arm in the same plane as the tip of the scale;
   d) a handle connected to the end of the scale opposite the tip of the scale and configured to enable one handed operation.

* * * * *